Patented Mar. 27, 1928.

1,664,067

UNITED STATES PATENT OFFICE.

GEORGE W. B. EVANS, OF WILDERNESS, VIRGINIA, ASSIGNOR TO EVANS ORE REDUCTION COMPANY, OF WASHINGTON, DISTRICT OF COLUMBIA.

PROCESS FOR TREATING REFRACTORY ORES CONTAINING PRECIOUS METALS.

No Drawing.   Application filed August 13, 1926. Serial No. 128,990.

My invention relates primarily to the metallurgical art, has special reference to the preliminary treatment of refractory ores for the recovery of precious metals, such as gold, silver, copper and the like. It has for its object the elimination of sulfur, arsenic, tellurium and other deleterious matter, and render the ore suitable for successful subsequent treatment by amalgamation, cyanidation or other methods of separating the values from the ore.

My invention therefore consists in the process of treating ores which will be fully disclosed in the following specification and claim.

It is my purpose to exclude atmospheric air and treat the ore in an airtight furnace, into which the ore and a combination of dry chemicals are placed, and subject it to exterior and interior heat; the exterior heat being from wood or coal fires, oil, gas, or electric heat; and the interior heat by admitting highly heated hydrogen gas through a feed pipe by pressure; within the furnace I have a number of revolving lifting plates or shelves which agitate the ore and keep it moving.

The combination of chemicals used in my process consists of lime, usually air-slacked, powdered sal ammoniac and common table salt.

The quantity of each chemical depends upon the character of the ore, and it is sometimes necessary to add a small proportion of sodium hydroxide, charcoal, bone dust or litharge, for the purpose of assisting in separating and cleansing the precious metals.

The object of the chemicals is to prevent escape of the precious metals in the fumes, to separate the precious metals from all baser metals; and to cleanse them from all impurities and acids; no moisture being admitted at any time during operations. The ore being desulfurized and thoroughly released from all baser metals and minerals by the aforesaid treatment, when cooled, is in condition for recovering the precious metals therein contained, by amalgamation or other approved means.

It has been found, from practical experiments, that my process produces better results than any known process heretofore used. Other dry chemicals may be used, but they are all superfluous.

Having thus described my process, what I claim is:

The process of treating refractory ores containing precious metals, which consists in mixing ore with lime, salt and sal-ammoniac, heating the mixture in an atmosphere of hydrogen while being agitated, and separating out the precious metals.

In testimony whereof I hereby affix my signature.

GEORGE W. B. EVANS.